US007453589B2

(12) United States Patent
Nakagawa

(10) Patent No.: US 7,453,589 B2
(45) Date of Patent: Nov. 18, 2008

(54) INFORMATION APPARATUS

(75) Inventor: Yoshio Nakagawa, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 901 days.

(21) Appl. No.: 10/876,671

(22) Filed: Jun. 28, 2004

(65) Prior Publication Data

US 2004/0266253 A1 Dec. 30, 2004

(30) Foreign Application Priority Data

Jun. 30, 2003 (JP) ............................. 2003-188191

(51) Int. Cl.

| | |
|---|---|
| ***G06F 15/00*** | (2006.01) |
| ***G06K 1/00*** | (2006.01) |
| ***G06K 15/00*** | (2006.01) |
| ***H04N 1/21*** | (2006.01) |
| ***H04N 1/23*** | (2006.01) |

(52) U.S. Cl. ...................................... 358/1.14; 358/296

(58) Field of Classification Search .................. 358/1.9, 358/296, 305, 401, 504, 505; *H04N 1/00, H04N 1/21, 1/23; G03G 15/00, 21/00; G06F 15/00; G06K 15/00, 1/00*

See application file for complete search history.

(56) References Cited

U.S. PATENT DOCUMENTS

| | | | | |
|---|---|---|---|---|
| 5,400,146 | A * | 3/1995 | Otsuki et al. | 358/296 |
| 5,546,144 | A * | 8/1996 | Lam et al. | 353/120 |
| 6,961,147 | B2 * | 11/2005 | Ishiyama | 358/1.9 |
| 7,187,479 | B2 * | 3/2007 | Togashi | 358/497 |
| 2003/0010903 | A1 * | 1/2003 | Hsu | 250/222.1 |
| 2003/0027450 | A1 * | 2/2003 | Nagata et al. | 439/357 |
| 2003/0184771 | A1 * | 10/2003 | Yamamoto et al. | 358/1.7 |

FOREIGN PATENT DOCUMENTS

| | | |
|---|---|---|
| JP | Y2 2536761 | 2/1997 |
| JP | A 2000-275922 | 10/2000 |
| JP | A 2001-343791 | 12/2001 |

* cited by examiner

*Primary Examiner*—Edward L. Coles
*Assistant Examiner*—James A Thompson
(74) *Attorney, Agent, or Firm*—Oliff & Berridge, PLC

(57) ABSTRACT

An information apparatus includes a housing, a cover mounted to the housing in an openable and closable manner, a detection device that detects an open state and a closed state of the cover, a penetrating hole provided in one of the housing or the cover and a protruding portion provided in the housing or the cover where the penetrating hole is not provided.

20 Claims, 13 Drawing Sheets

INFORMATION APPARATUS

CROSS-REFERENCE TO RELATED APPLICATION

This application claims priority from JP 2003-188191, filed Jun. 30, 2003, the disclosure of which is incorporated in its entirety herein by reference thereto.

BACKGROUND OF THE INVENTION

1. Field of Invention

The invention relates to an information apparatus with a cover that is associated with a housing in an openable and closable manner.

2. Description of Related Art

There exists an information apparatus, such as a facsimile machine, with a detection device, such as a micro switch, that detects an open state and a closed state of a cover. The cover is mounted to a housing of the apparatus in an openable and closable manner. For example, in Japanese Utility Model Registration No. 2536761, a penetrating hole is provided in the housing of the apparatus and a protruding portion is provided on a cover body. This apparatus is structured such that, when the cover is closed, the protruding portion passes through the penetrating hole and a micro switch placed in the deep recess of the hole is pressed.

Most information apparatuses are provided with an engaging device that retains the cover in the closed position. As such, there exists an engaging device and detection device that utilizes a common structure. In Japanese Laid-Open Patent Publication No. 2000-275922, for example, the engaging device and the detection device have a favorable relationship, thereby misdetection can be prevented. For example, in a facsimile machine where the cover is held closed by engaging a hook on the cover with a pin on the housing, when the hook is engaged with the pin, a micro switch disposed at the engagement position is pressed to detect an open state and a closed state of the cover.

SUMMARY OF THE INVENTION

However, when the engagement between the hook and the pin is used, it is necessary to position the hook, the pin, and the micro switch very accurately, or to provide at least two pairs of hooks and pins in one apparatus, which may raise the manufacturing costs. In addition, if the engagement between the hook and the pin is not proper, the state of the cover may not be detected.

The invention thus provides, among other things, an information apparatus in which a device for retaining a cover in a closed position and a detection device for detecting an open state and a closed state of the cover are realized using a common structure, in order to reduce the cost of manufacturing and to improve the reliability of detection of the state of the cover.

According to one exemplary aspect of the invention, an information apparatus may include a housing, a cover mounted to the housing in an openable and closable manner, a detection device that detects an open state and a closed state of the cover, a penetrating hole provided in one of the housing or the cover and a protruding portion provided in the housing or the cover where the penetrating hole is not provided. When the cover is opened or closed, at least one of the protruding portion and the penetrating hole is elastically deformed to allow an end part of the protruding portion to pass through the penetrating hole, and the at least one of the protruding portion and the penetrating hole that is elastically deformed is returned to an original state thereof after the end part of the protruding portion has passed through the penetrating hole. When the cover is closed, the end part of the protruding portion and the penetrating hole are connected by elastic engagement. Furthermore, the detection device detects the open state and the closed state of the cover based on a presence or absence of the engagement between the end part of the protruding portion and the penetrating hole.

According to another exemplary aspect of the invention, a method of closing a housing relative to a cover may includes the steps of elastically deforming at least one of a penetrating hole, provided in one of the housing or the cover, or a protruding portion, provided in the housing or the cover where the penetrating hole is not provided, to allow an end part of the protruding portion to pass through the penetrating hole, returning at least one of the protruding portion and the penetrating hole that is elastically deformed to an original state thereof after the end part of the protruding portion has passed through the penetrating hole, wherein the end part of the protruding portion and the penetrating hole are connected by elastic engagement, and detecting the closed state of the cover based on a presence of the engagement between the end part of the protruding portion and the penetrating hole.

BRIEF DESCRIPTION OF THE DRAWINGS

An embodiment of the invention will be described in detail with reference to the following figures wherein.

DETAILED DESCRIPTION OF PREFERRED EMBODIMENTS

Figure 1:
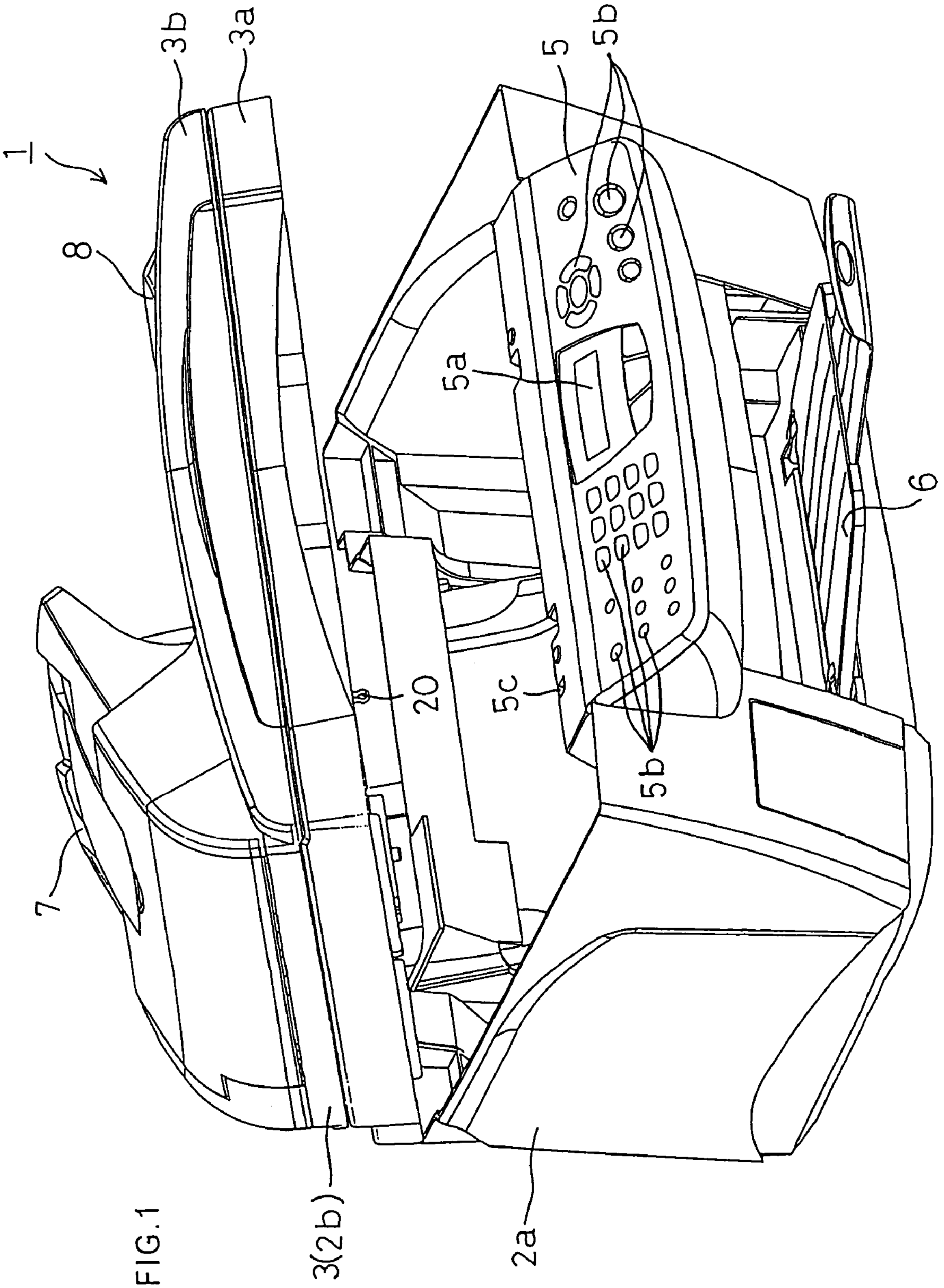
FIG. 1 is a perspective view of an entire appearance of a multifunction machine according to an embodiment of the invention.

As illustrated in FIG. 1, the multifunction machine 1 has a clamshell-shaped (or rear hinged) open and closed configuration. An upper body 2*b* is attached to and movable relative to a lower body 2*a* so that the upper body 2*b* can move from an open state to a closed state relative to the lower body 2*a*.

Figure 2A:
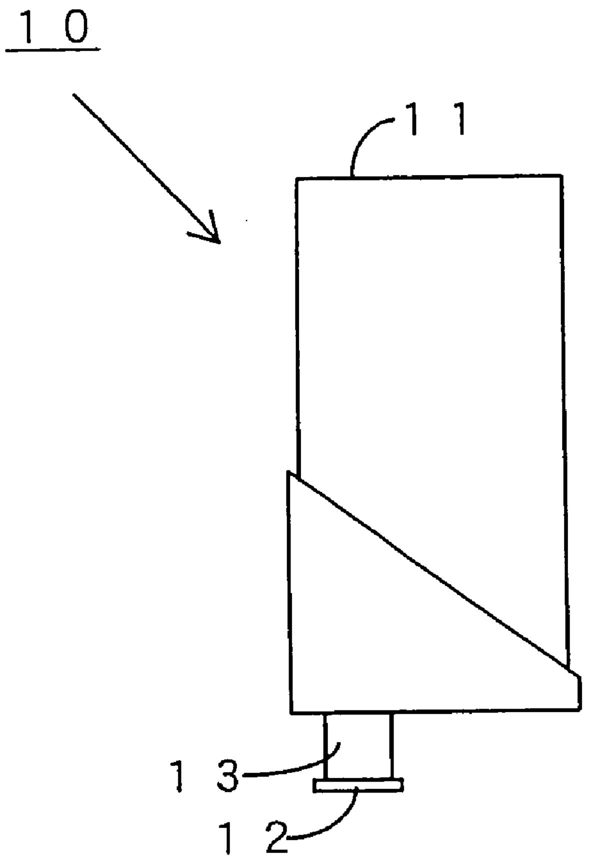
FIGS. 2A and 2B are explanatory views of a configuration of a printer engine of the multifunction machine.
Figure 2B:
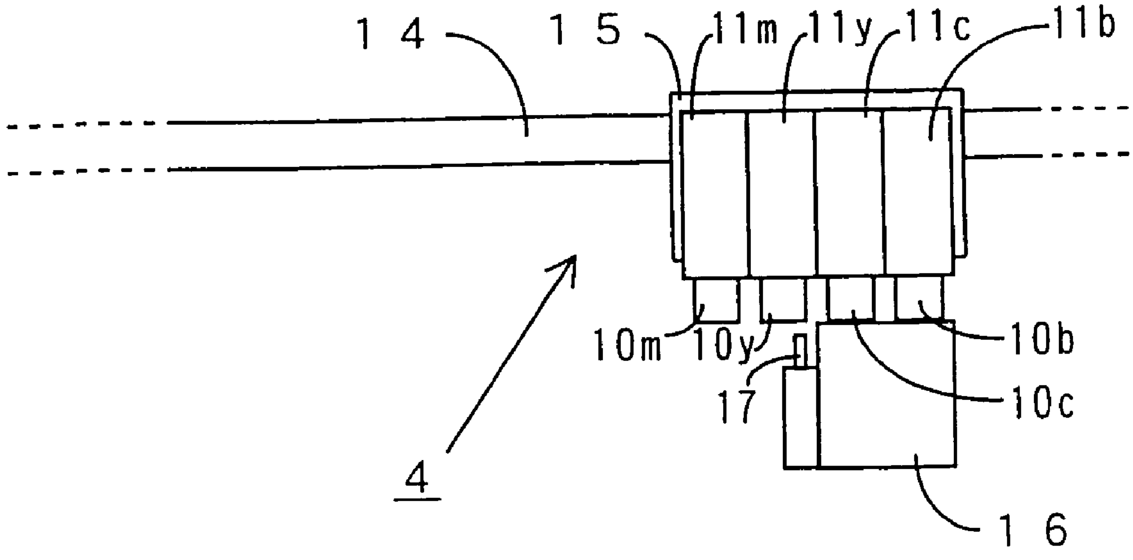

The upper body 2*b* includes an image reading device 3 and the lower body 2*a* includes an image forming portion such as a printer engine 4 (refer to FIG. 2B).

An operation panel 5 is provided in front of the lower body 2*a*. The operation panel 5 comprises an LCD 5*a* and various input keys 5*b*. A discharge tray 6 is provided under the operation panel 5 in order to discharge a recording (not shown) on which an image has been formed by the image forming portion. As should be appreciated, the recoding is a recording medium and the recording and recording medium includes any sheet, recording sheet, recording material or any surface of an object currently available or later developed that can receive, record or accept an image from the image forming portion.

The image reading device 3 has both a flatbed function (FB) and an automatic document feeder function (ADF). The image reading device 3 has a clamshell-shaped open and closed configuration. A cover portion 3*b*, as a cover for a document holder, is attached to a flatbed portion 3*a* as a document holder so as to allow the cover portion 3*b* to open and close. The cover portion 3*b* is provided with a document feed tray 7, which is used for automatic document feeding, and a document discharge tray 8. Platen glass (not shown) for locating a document is provided on the upper surface of the flatbed portion 3*a*. An image sensor 9 (refer to FIG. 5) is provided underneath the platen glass.

The image reading device 3 is a known device, i.e. after a document in the document feed tray 7 is transferred to the front side of the image sensor 9 for an image reading, the document is discharged to the document discharge tray 8. And the image sensor 9 is moved along the platen glass of the flatbed portion 3*a* to read the image of the document placed on the platen glass.

The printer engine 4 comprises a recording head 10 as illustrated in FIG. 2A. The recording head 10 is designed so that an ink cartridge 11 can be attached and detached freely. The recording head 10 comprises an actuator 13, which ejects ink contained in the ink cartridge 11 onto a recording medium, e.g. paper through a nozzle plate 12 having a nozzle array. As should be appreciated, any recording material, including inks, liquids, toners, consumables, ejecting materials or any substance currently available or later developed can be used that can be ejected from the nozzle plate 12. The recording material also includes ink ribbons and other devices currently available or later developed that can be used to form an image onto a recording.

As shown in FIG. 2B, the recording head 10 is provided with four recording heads corresponding to four separate colors: magenta, yellow, cyan, and black (10*m*, 10*y*, 10*c*, and 10*b*: hereinafter, these reference numerals are used if distinction between the colors is necessary). The four recording heads 10 are mounted on a carriage 15, which moves along a guide 14 in a direction perpendicular to the transfer direction of a recording paper. At one end of the moving direction of the carriage 15, there are provided maintenance devices such as a drawing cap 16 for performing a drawing operation to the nozzle array provided in the nozzle plate 12, and a wiper 17 for wiping the nozzle plate 12. In the vicinity thereof, a flushing area is located in order to allow every recording head 10 to perform a flushing operation.

As seen in FIG. 1, a rectangular penetrating hole 5*c* is provided on the edge of the upper surface of the lower body 2*a* (specifically, on the edge of the upper surface of the operation panel 5). A protruding portion 20, which is connected with the penetrating hole 5*c* by elastic engagement, is provided on the edge of the under surface of the flatbed portion 3*a*, which comprises a part of the upper body 2*b*. The engagement between the protruding portion 20 and the penetrating hole 5*c* maintains the closed state of the flatbed portion 3*a* with respect to the lower body 2*a*.

Due to this engagement, the operation is simplified in which only the cover portion 3*b* is opened to allow the flatbed function (FB) to read the image. In short, the flatbed portion 3*a* and the cover portion 3*b* are formed in approximately congruent rectangles when viewed from top views, and are designed to be opened and closed around an edge on the same side (a longer side). Nevertheless, with the engagement as described above, only the upper cover portion 3*b* can be opened without great difficulty.

Figure 3:
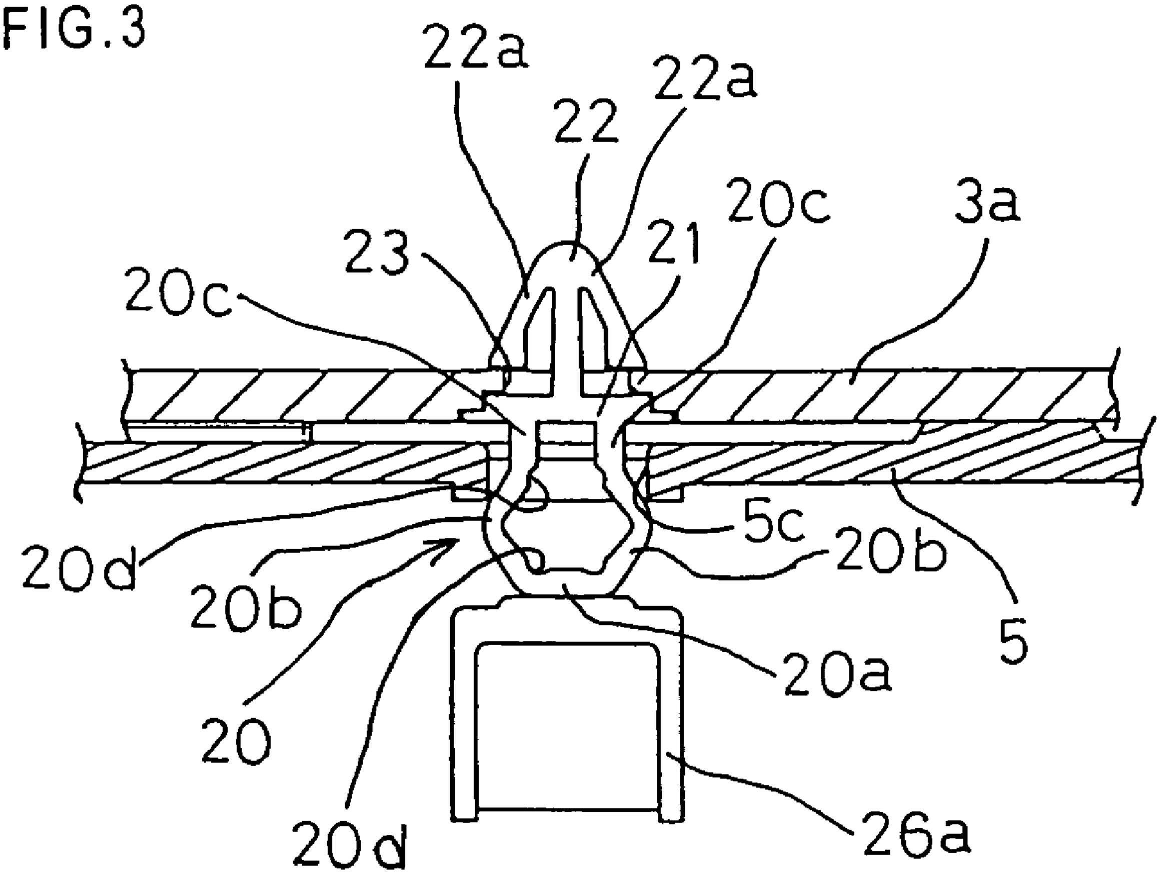
FIG. 3 is an enlarged view of a configuration in the vicinity of a protruding portion and a penetrating hole of the multifunction machine.

FIG. 3 is an enlarged view of the configuration in the vicinity of the protruding portion 20. As illustrated in FIG. 3, the protruding portion 20 comprises; a horizontal portion 20*a* in parallel with the under surface of the flatbed portion 3*a*; a pair of elastic portions 20*b* whose bottom ends are connected to both ends of the horizontal portion 20*a* and which have approximately V-shaped configurations opposed to each other; and connecting portions 20*c* which extend vertically from the upper ends of the elastic portions 20*b* so as to be connected with a flange portion 21. The protruding portion 20 is configured such that it is substantially rectangular in cross section and each constitutional part is connected linearly.

A mounting hole 23, formed stepwise so as to make the diameter bigger downwardly, is provided on the under surface of the flatbed portion 3*a*. The flange portion 21 is engaged with the mounting hole 23, so that the under surface of the flange portion 21 becomes flat or substantially flush with the under surface of the flatbed portion 3*a*. Also, a periphery of the flange portion 21 is formed stepwise. The steps of the flange portion 21 are engaged with those of the mounting hole 23, thereby blocking dust from entering the flatbed portion 3*a*.

In the center of the flange portion 21, an engaging portion 22 is provided in a direction opposite to the protruding portion 20. After the engaging portion 22 is pressed into the mounting hole 23, both wings 22*a* are spread out. Consequently, the protruding portion 20 and the flange portion 21 are fixed to the under surface of the flatbed portion 3*a*. The protruding portion 20, the flange portion 21 and the engaging portion 22 are integrally molded preferably with elastic poly acetal resin (POM: polyoxymethylene). Constricted portions 20*d* are provided inside of the connecting parts between both ends of the horizontal portion 20*a* and the bottom ends of the elastic portions 20*b*, and between the connecting parts between the upper ends of the elastic portions 20*b* and the connecting portion 20*c*. Therefore, the protruding portion 20 whose side view is approximately in the form of a hexagon is preferably constricted, with the protruding portion 20 crushing the hexagon in the longitudinal direction (the transfer direction of the protruding portion 20 caused by the opening and closing operation of the flatbed portion 3*a*) as well as in the lateral direction (the direction perpendicular to the aforementioned transfer direction).

The penetrating hole 5*c* of the operation panel 5 (made of polystyrene) is 7.1±0.05 mm in width in the direction shown in FIG. 3. The protruding portion 20 (i.e. the distance between the tops of the elastic portions 20*b*) is 7.7±0.05 mm in width in the direction shown in FIG. 3. Thus, the protruding portion 20 is elastically deformed in the direction that the diameter is constricted so as to pass through the penetrating hole 5*c*. After passing through the penetrating hole 5*c*, the protruding portion 20 recovers to approximate some of its original state, thereby fixing the flatbed portion 3*a* to the upper surface of the operation panel 5. Additionally, the inner wall of the penetrating hole 5*c* abuts with the V-shaped inclined portions of each elastic portion 20*b*. Therefore, the opening and closing operation of the upper body 2*b* can be performed more smoothly and the elastic engagement can be more stable.

A clearance (i.e., looseness) is horizontally provided between the protruding portion 20, which has returned to its original state, and the penetrating hole 5*c*. The clearance is created because the protruding portion 20 is narrower than the penetrating hole 5*c* at the connection portions 20*c*. In the embodiment of the invention, the elastic engagement between the protruding portion 20 and the penetrating hole 5*c* is utilized, and the looseness is provided as described above. Therefore, even though the positional relationship between the protruding portion 20 and the penetrating hole 5*c* is relatively rough or not tightly controlled, the elastic engagement can be preferably achieved. Also, the engagement between the protruding portion 20 and the penetrating hole 5*c* is relatively strong against a force applied in a vertical direction. Therefore, even if the protruding portion 20 and the penetrating hole 5*c* are provided at only a single place, the upper body 2*b* can be preferably retained in the closed position.

Figure 4A:
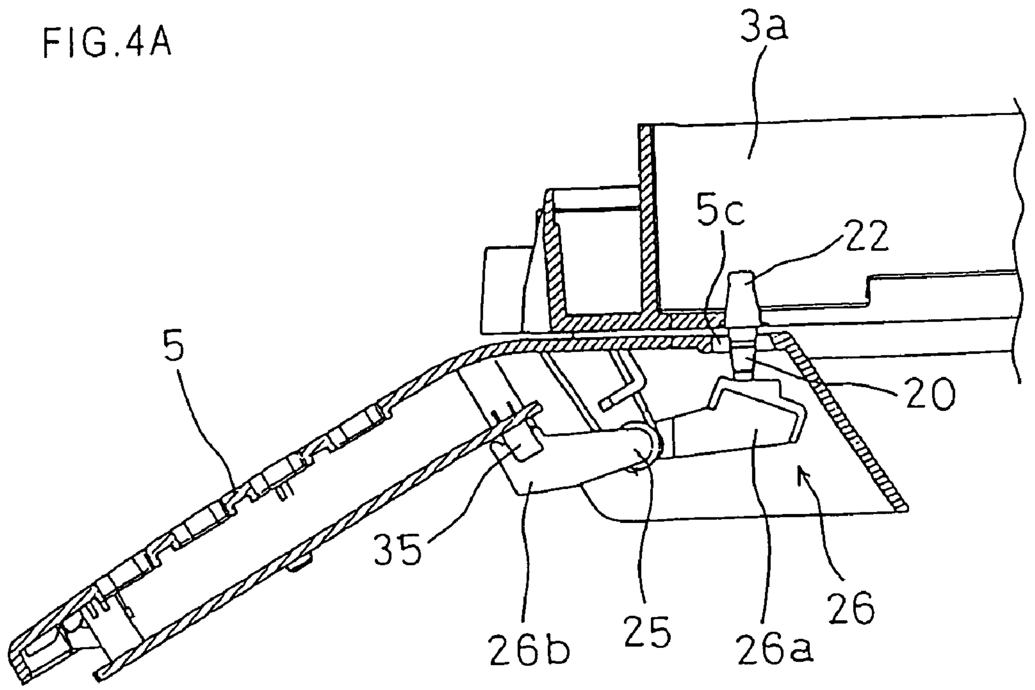
FIGS. 4A and 4B are explanatory views of a configuration of a detection device of the multifunction machines.
Figure 4B:
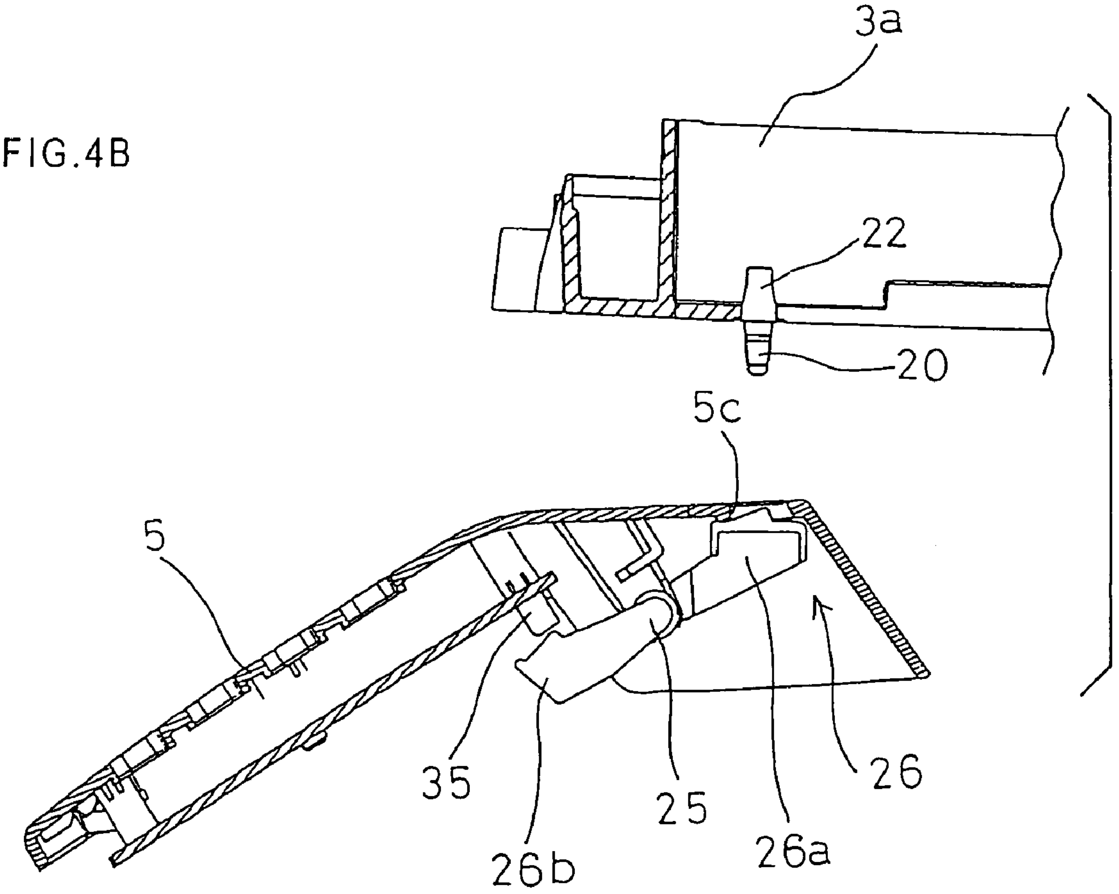

As shown in FIGS. 4A and 4B, a transfer member 26, which swings around a supporting point 25, is provided on the under surface of the operation panel 5. An end 26*a* of the transfer member 26 is visibly contacted with the penetrating hole 5*c* as shown in FIG. 4B. When the flatbed portion 3*a* is closed, the end 26*a* is pressed against the horizontal portion 20*a* of the protruding portion 20. Consequently, as illustrated in FIG. 4A, the transfer member 26 swings in the clockwise direction. In the vicinity of the other end 26*b* of the transfer member 26, there is provided an opening and closing sensor 35, which comprises an optical sensor as a cover detection device. After the transfer member 26 swings as described above, the other end 26*b* of the transfer member 26 interrupts the optical path of the opening and closing sensor 35. The transfer member 26 is supported by the supporting point 25 for balance in such a way that the other end 26*b* is heavier than the end 26*a*. Thus, once the flatbed portion 3*a* is open, the end 26*a* swings until exposed in the penetrating hole 5*c*, and the optical path of the opening and closing sensor 35 is no longer interrupted.

Figure 5:
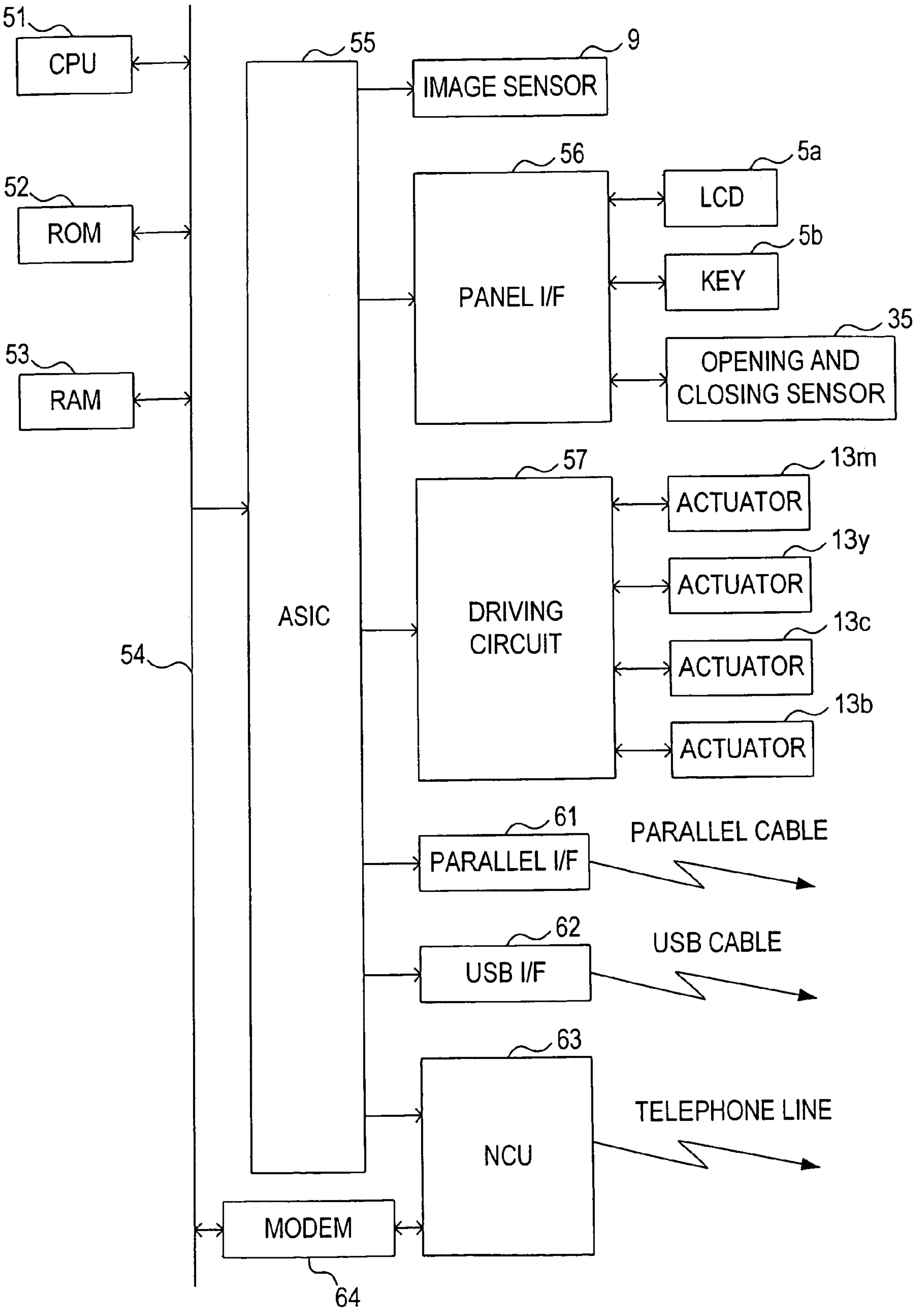
FIG. 5 is a block diagram of a configuration of a control system of the multifunction machine.

In the multifunction machine 1, the open/closed state of the flatbed portion 3*a* is detected by the opening and closing sensor 35, and the following control is executed. FIG. 5 is a block diagram of a configuration of a control system of the multifunction machine 1. As illustrated in FIG. 5, the control system is mainly configured as a microcomputer that is made by connecting CPU 51, ROM 52, and RAM 53, via a bus 54. The bus 54 is connected to an ASIC (Application Specific Integrated Circuit) 5 as well.

The image sensor 9 is connected to the ASIC 55. The LCD 5*a* and the various keys 5*b* on the operation panel 5, and the opening and closing sensor 35 are connected to the ASIC 55 through a panel interface (panel I/F) 56. Actuators 13*m*, 13*y*, 13*c*, and 13*b*, corresponding to the colors of the recording heads 10 are connected to ASIC 55 through a driving circuit 57. A parallel interface (parallel I/F) 61 for communication via a parallel cable, a USB interface (USB I/F) 62 for communication via a USB cable, and a NCU 63 for communication via a telephone line etc., are connected to the ASIC 55.

Although their figures are not shown here, various motors used to transfer recording paper and documents, and to move the carriage 15, are also connected to the ASIC 55. The NCU 63 is connected to the bus 54 as well via a modem (MODEM) 64.

Figure 6:
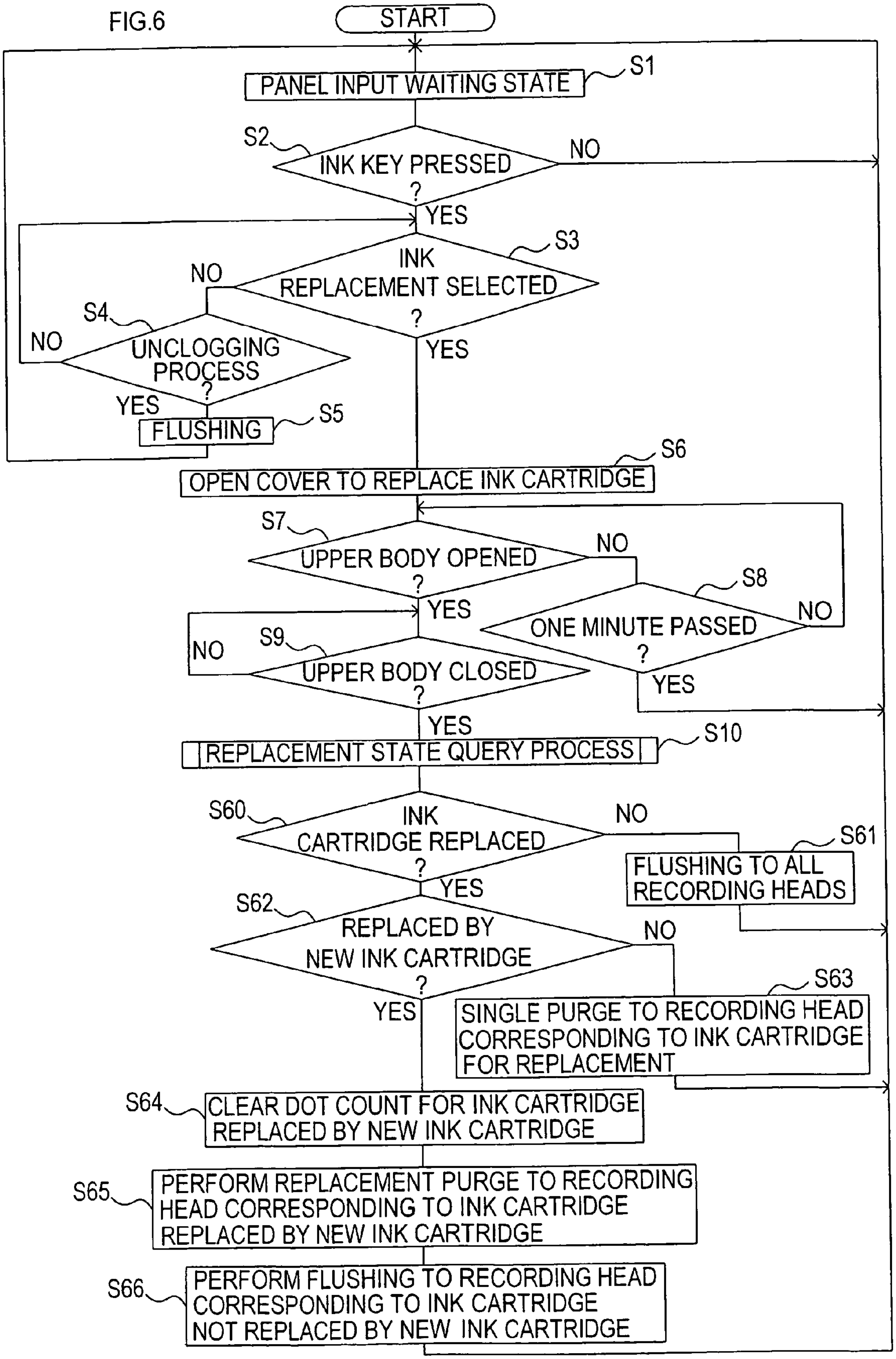
FIG. 6 is a flowchart of a process that the control system executes in a stand-by state.

The process that the CPU 51 executes based upon a program stored in the ROM 52 will now be described. FIG. 6 is a flowchart of the process that the CPU 51 executes in a stand-by state. When the process is started, the CPU 51 first causes the display of the LCD 5*a* to be in a panel input waiting state in S1 (S represents a single step). Then in S2, it determines whether an ink key has been pressed. When it is determined that the ink key has not been pressed (S2: NO), the panel input waiting state in S1 is maintained. When it is determined that the ink key has been pressed (S2: YES), the process moves to S3.

In S3, it is determined whether the ink replacement has been selected. When it is determined that the ink replacement has not been selected (S3: NO), the process moves to S4 to determine whether an unclogging process has been selected. When it is determined that the unclogging process has also not been selected (S4: NO), the process returns to S3 to repeat the processes of S3 and S4 until either process is selected. If the unclogging process is selected (S4: YES), flushing is performed to all of the recording heads 10 (S5), and the process moves to S1.

On the other hand, if the ink replacement is selected (S3: YES), the process moves to S6. In S6, a message indicating "OPEN COVER TO REPLACE INK CARTRIDGE" is displayed on the LCD 5*a*. Once the message is displayed, the user of the multifunction machine 1 opens the upper body 2*b* (the flatbed portion 3*a* and the cover portion 3*b*), replaces the ink cartridge 11 of an appropriate color, and closes the upper body 2*b*.

In S7 following S6, it is determined whether the upper body 2*b* has been open based upon the detection signals of the opening and closing sensor 35. When the upper body 2*b* has not been opened (S7: NO), the process moves to S8 to determine whether a predetermined time, for example, one minute, has passed. When one minute has not passed (S8: NO), the process returns to S7. When one minute has passed while the processes of S7 and S8 are repeated (S8: YES), the process returns to the aforementioned process of S1. On the other hand, when the upper body 2*b* has been opened while the processes of S7 and S8 are repeated (S7: YES), the process waits until the upper body 2*b* is closed in S9. When the upper body 2*b* is closed (S9: YES), the process moves to S10 to execute the following replacement state query process.

Figure 7:
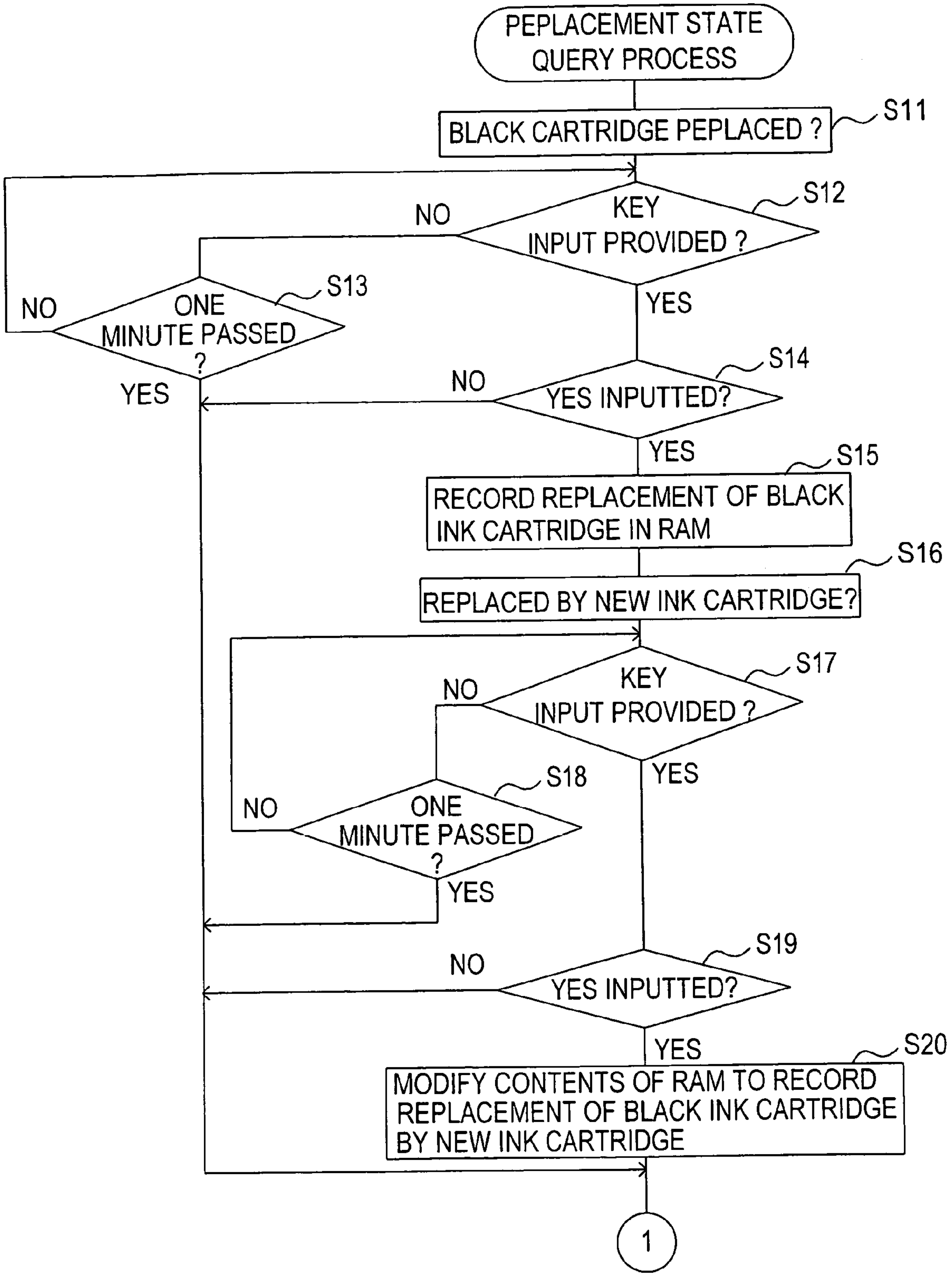
FIG. 7 is a flowchart of a replacement state query process during the process.

In the replacement state query process, a message indicating "BLACK INK CARTRIDGE REPLACED?" is first displayed on the LCD 5*a* in S11 as illustrated in FIG. 7. In S12, it is determined whether key input has been provided. When it is determined that key input has not been provided (S12: NO), the process moves to S13. In S13, it is determined whether a predetermined time, for example, one minute, has passed. When one minute has not passed (S13: NO), the process returns to S12. When one minute has passed without any key input (S13: YES), it is determined that the ink cartridge 11*b* has not been replaced, and the process moves to S21 in FIG. 8.

On the other hand, if the key input has been provided before one minute passes (S12: YES), it is determined whether "YES" has been inputted with respect to the above described message in S14. The key input in this case may be replaced by numbers such as YES=1 and NO=2, or other known equivalents for indicating an answer to a YES or No question.

When it is determined that YES has been inputted (S14: YES), the process moves to S15 to store in the RAM 53 that the black ink cartridge 11*b* has been replaced. In S16, a message indicating "REPLACED BY NEW INK CARTRIDGE?" is displayed on the LCD 5*a*. In S17, it is determined whether a key input has been provided. When it is determined that a key input has not been provided (S17: NO), the process moves to S18. In S18, it is determined whether one minute has passed. When it is determined that one minute has not passed (S18: NO), the process returns to S17. When it is determined that one minute has passed without any key input (S18: YES), it is determined that the ink cartridge 11*b* has not been replaced by a new ink cartridge 11*b*, and the process moves to S21 in FIG. 8.

On the other hand, if a key input is provided before one minute passes (S17: YES), it is determined in S19 whether YES has been inputted with respect to the message. If YES has been inputted (S19: YES), the process moves to S20. The memory contents of the RAM 53 stored in S15 are modified to represent that the black ink cartridge 11*b* has been replaced by the new one, and the process moves to S21 in FIG. 8. If NO has been inputted in S14 or S19 (S14: N0 or S19: NO), all the steps that follow are skipped and the process moves directly to S21.

Figure 8:
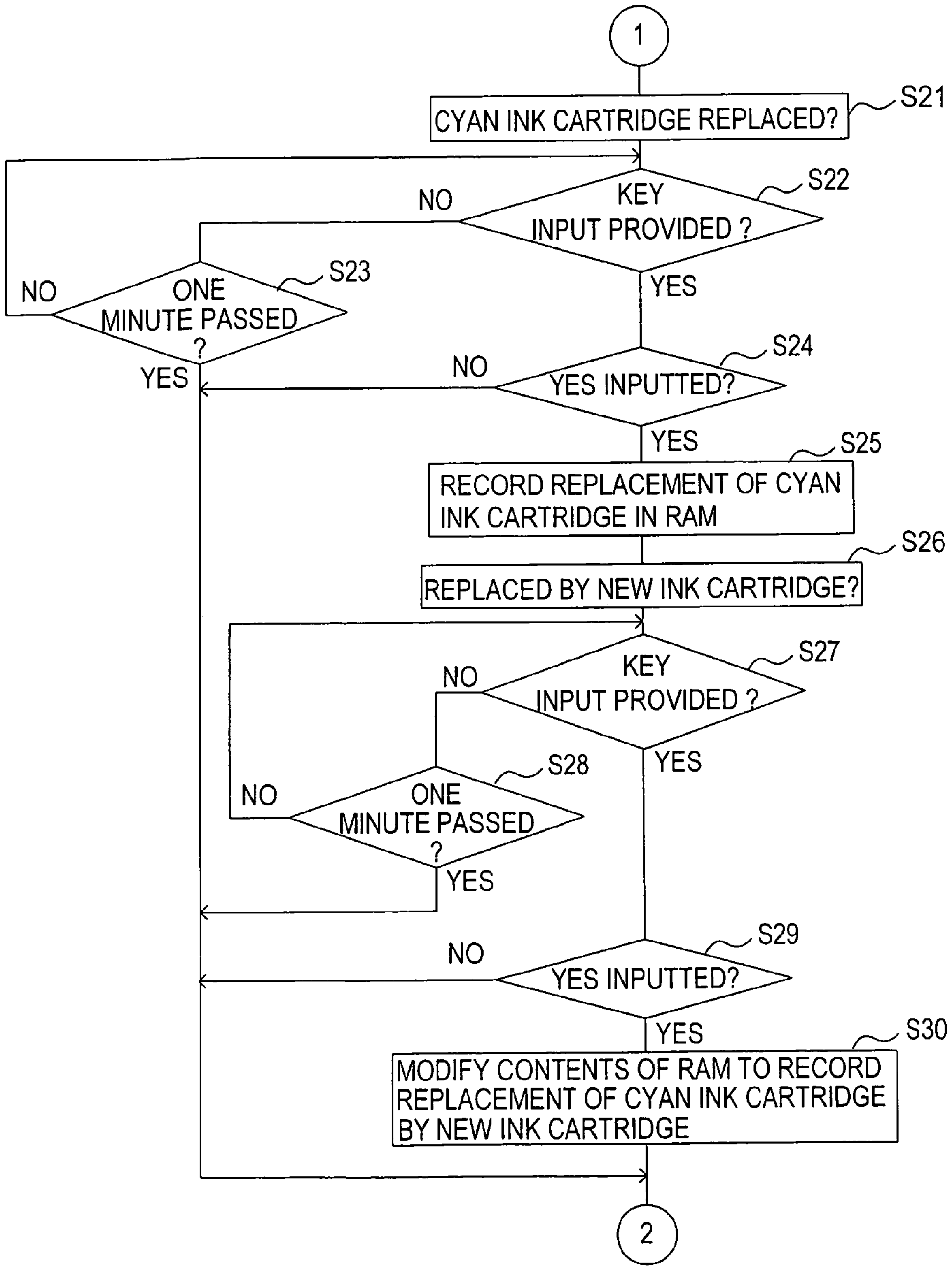
FIG. 8 is a flowchart of a continuation of the replacement state query process.
Figure 9:
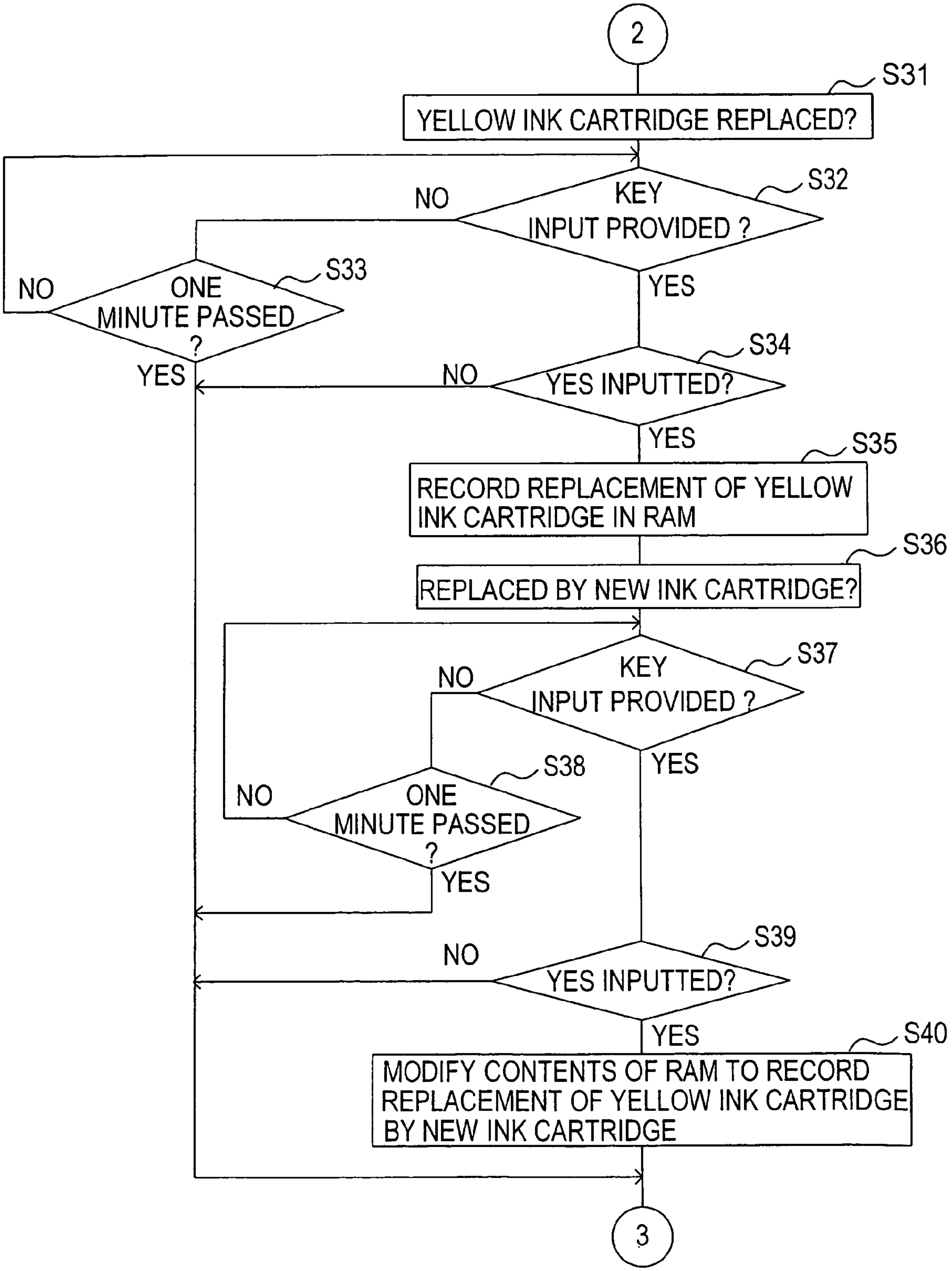
FIG. 9 is a flowchart of a further continuation of the replacement state query process.
Figure 10:
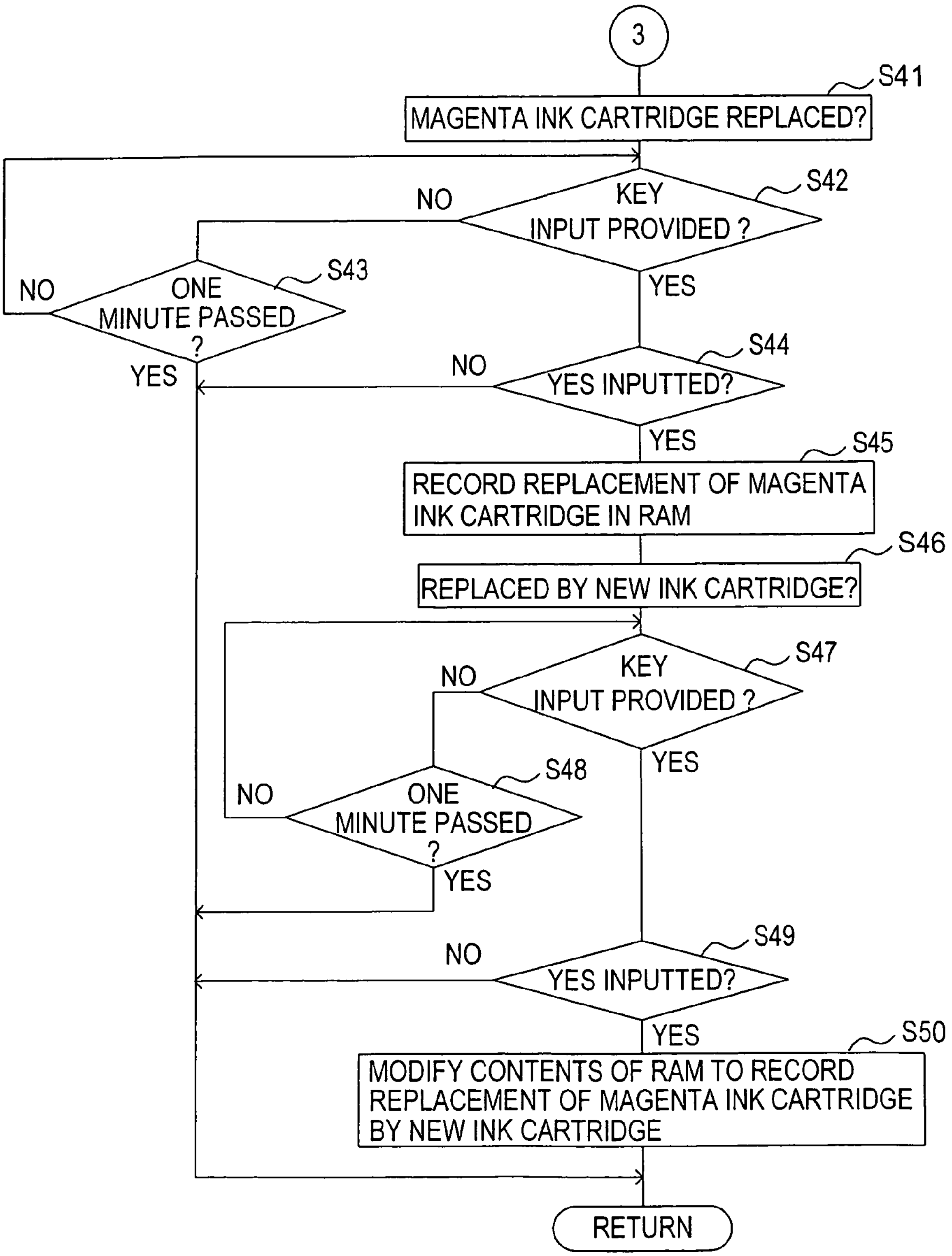
FIG. 10 is a flowchart of a further continuation of the replacement state query process.

From S21 to S30 illustrated in FIG. 8, the same process as described in S11 to S20 is performed with respect to whether the cyan ink cartridge 11*c* has been replaced (S21 to S25), and whether the cyan ink cartridge 11*c* has been replaced by a new ink cartridge (S26 to S30). Subsequently from S31 to S40 illustrated in FIG. 9, the same process as described in S11 to S20 is performed with respect to whether the yellow ink cartridge 11*y* has been replaced (S31 to S35), and whether the yellow ink cartridge 11*y* has been replaced by a new ink cartridge (S36 to S40). Further subsequently, from S41 to S50 illustrated in FIG. 10, the same process as described in S11 to S20 is performed with respect to whether the magenta ink cartridge 11*m* has been replaced (S41 to S45), and whether the magenta ink cartridge 11*m* has been replaced by a new ink cartridge (S46 to S50). The process moves to S60 in FIG. 6.

In S60, it is determined whether the ink cartridge 11 has been replaced based upon the results of the replacement state query process (from S11 to S50). When it is determined that no ink cartridge 11 has been replaced at all (S60: NO), the carriage 15 is moved to the flushing area. The actuators 13*b*, 13*c*, 13*y*, and 13*m* corresponding to the ink cartridges 11*b*, 11*c*, 11*y*, and 11*m* are driven; flushing is performed to all of the recording heads 10; and the process moves to S1.

On the other hand, when it is determined that at least one ink cartridge 11 has been replaced (S60: YES), the process moves to S62 to determine whether the ink cartridge 11 has been replaced by a new ink cartridge. If it is determined that no ink cartridge 11 has been replaced by a new ink cartridge (S62: NO), a nozzle array corresponding to the replaced ink cartridge 11, and a nozzle array corresponding to an ink cartridge arranged adjacent to the replaced ink cartridge 11, are moved to the front of the drawing cap 16 for a single purge. Then, the process moves to S1 (S63). The drawing cap 16 has a width of two nozzle arrays for two colors as illustrated in FIG. 2B, and is configured to purge (performing drawing operations) two inks arranged adjacent to each other simultaneously, that is, magenta and yellow inks, or cyan and black inks. In S63, for example, when it is determined that the cyan ink cartridge 11*c* has been replaced by a previously used ink cartridge, a single purge (a single drawing operation) is performed with respect to the nozzle arrays for cyan and black.

Back in FIG. 6, if it is determined that the ink cartridge 11 has been replaced by a new ink cartridge (S62: YES), the process moves to S64. In S64, the dot count is cleared for the newly replaced ink cartridge 11. The dot count is increased every time a single dot is ejected. The dot count is used for various processes for, such as an ink level display, which will be described hereinafter, and a warning of ink shortage. However, the dot count is not cleared for the ink cartridge 11, which has been replaced by a previously used ink cartridge (see S62 and S63).

In S65, the replacement purge is performed to the nozzle array corresponding to the new ink cartridge 11. The replacement purge refers to an operation in which the purge is repeated as many times as necessary until ink in the new ink cartridge 11 reaches the associated nozzles. As described above, the replacement purge is also simultaneously performed to the nozzle array corresponding to the ink cartridge arranged adjacent to the new ink cartridge. In S66, as in S61, an actuator 13 corresponding to the ink cartridge 11 that has not been replaced by a new ink cartridge is actuated, and flushing is performed to its corresponding recording head 10. Then, the process moves to S1.

Figure 11:
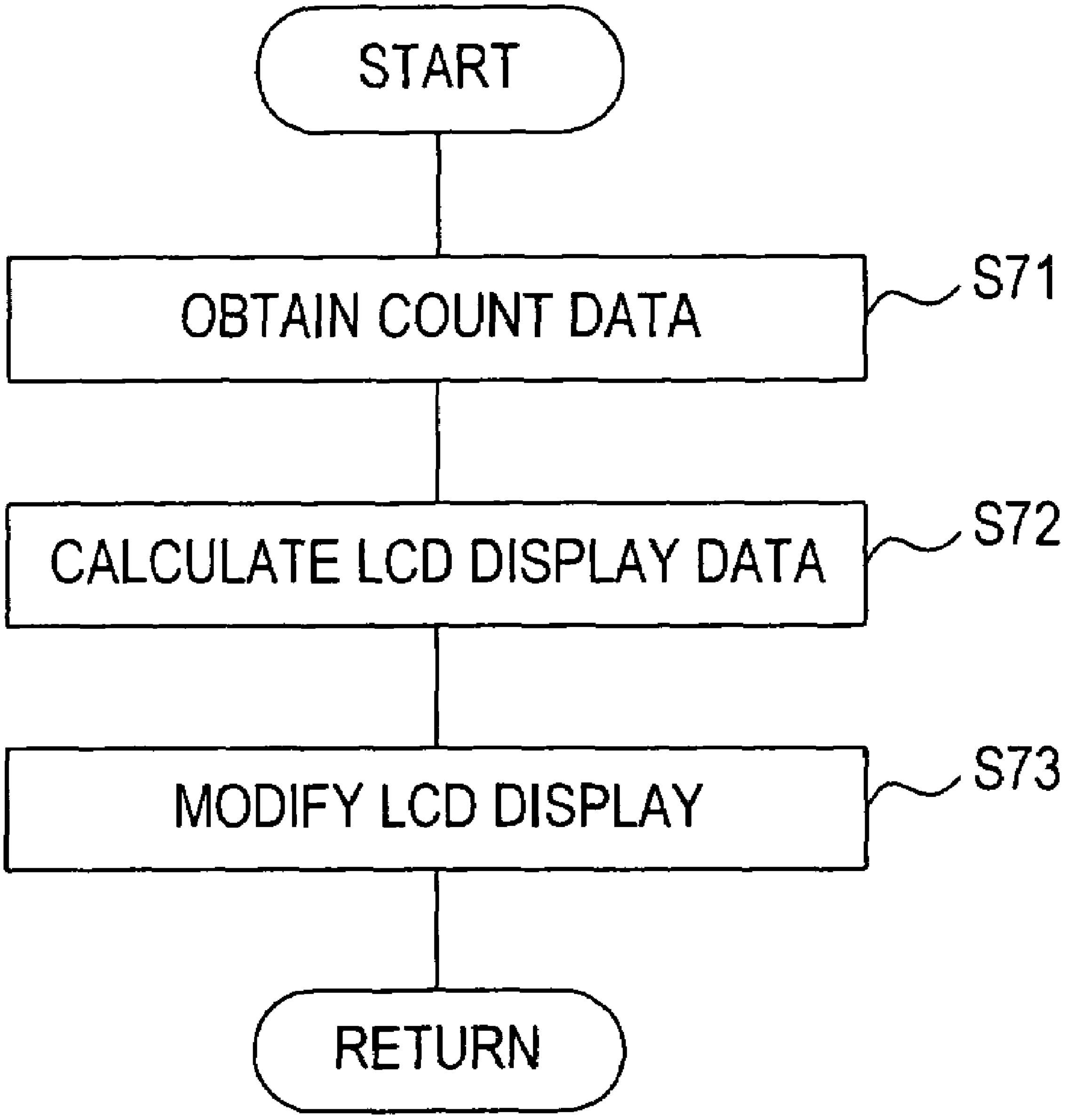
FIG. 11 is a flowchart of an ink level display process that the control system executes.

The process of an ink level display will now be described as an example of the process using the aforementioned dot count. FIG. 11 is a flowchart of an ink level display process. The CPU 51 repeatedly performs the process for every predetermined time period. As illustrated in FIG. 11, once the process gets started, the dot count data is obtained in S71. In S72, the data (the counting value of the ejected dots) is checked against a predetermined table and the display data for displaying the ink level on the LCD 5*a* is calculated. When the ink cartridges 11 of various sizes are attachable to the recording heads 10, various kinds of the tables may be prepared according to the sizes thereof.

Figure 12:
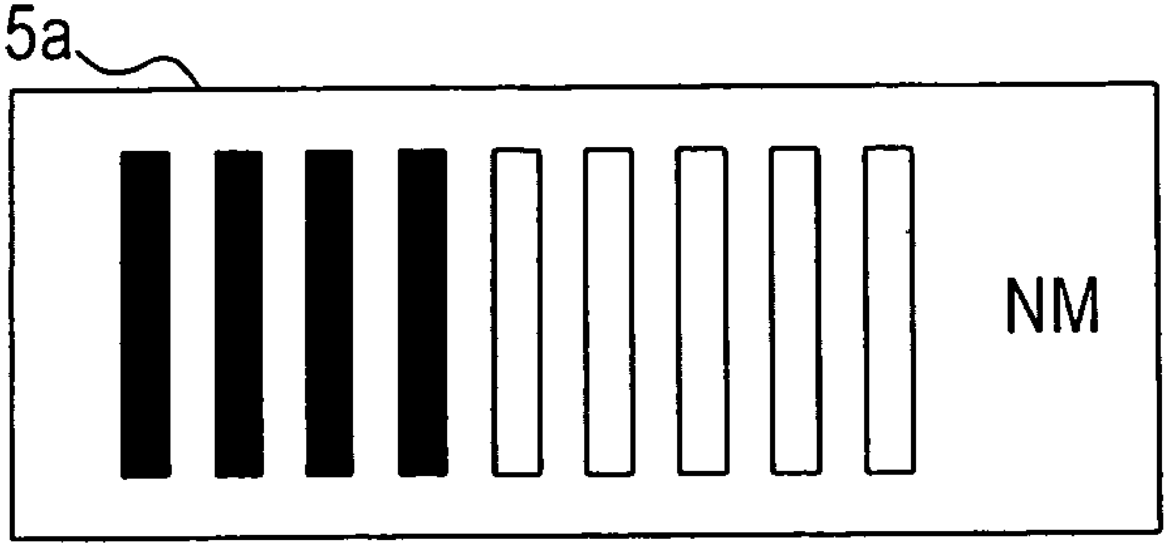
FIG. 12 is an explanatory view of a LCD display in the ink level display process.

In S73, the display of the LCD 5*a* is altered based upon the calculated display data, and one cycle of the process is completed. By this process, a display, in which squares are filled according to the remaining amount of ink, is shown on the LCD 5*a* as illustrated in FIG. 12. Because the dot count for the new ink cartridge 11 is cleared in the aforementioned process, the display on the LCD Sa preferably corresponds to the actual remaining amount of ink.

Thus, in the multifunction machine 1 of the present embodiment, the user is asked in the replacement state query process as to which ink cartridge 11 has been replaced and which ink cartridge 11 thereof has been replaced by a new ink cartridge (e.g. which replaced ink cartridge is new). Thereafter, the maintenance is performed according to each of the replacement states. In short, flushing is performed for a recording head corresponding to an unreplaced ink cartridge 11, a single purge is performed for a recording head whose ink cartridge 11 has been replaced by an ink cartridge previously used, and a replacement purge is performed for a recording head whose ink cartridge 11 has been replaced by a new ink cartridge.

Therefore, it is possible to maintain the ejection performance of a recording head 10 whose ink cartridge 11 has not been replaced by a new ink cartridge. Furthermore, it is possible to make a recording head 10 whose ink cartridge 11 has been replaced by a new one, ready to form images any time by performing the replacement purge.

The replacement state query process (S10) and the subsequent maintenance process (S60 to S66) are executed when the closing of the upper body 2*b* is identified as a trigger. Consequently, even if the user takes some time for replacement of ink, an error, e.g. a time-out, does not occur. Furthermore, maintenance is not performed with the upper body 2*b* open.

In the multifunction machine 1, regardless of the relatively rough positional relationship between the protruding portion 20 and the penetrating hole 5*c*, the elastic engagement can be desirably achieved. Consequently, the closing of the upper body 2*b* can be preferably detected. Additionally, even if the protruding portion 20 and the penetrating hole 5*c* are provided at only one place, the upper body 2*b* can be reliably retained in the closed position. As a result, in the multifunction machine 1, the manufacturing cost is reduced and the reliability of the detection of the state of the upper body 2*b* is improved, whereby the reliability of the control is enhanced as well. Also, the protruding portion 20 is easily constricted in the longitudinal direction due to the crushing of the hexagon shaped member, which also inhibits excessive force from being applied to the transfer member 26. Therefore, the positional relationship may be made further rougher, so that the manufacturing cost can be further reduced.

The present embodiment is not to be limited to the forms of the embodiment described above, and modifications and substitutions by one of ordinary skill in the art are considered to be within the scope of the present invention. For example, the opening and closing sensor 35 may detect the protruding portion 20 directly. However, when the opening and closing sensor 35 detects the transfer member 26 as described above, a degree of flexibility in arranging the opening and closing sensor 35 is increased. Additionally, if the protruding portion 20 is directly detected by an optical sensor such as the opening and closing sensor 35, the protruding portion 20 should have some degree of area. However, if the transfer member 26 is detected, the protruding portion 20 may be constructed from a linear elastic form as described above, so that a degree of flexibility in designing the protruding portion 20 can be increased. Furthermore, a detection device may detect the protruding portion magnetically or mechanically as a micro switch does.

The protruding portion 20 may be formed of metal or other elastic material such as rubber. However, when the protruding portion 20 is formed of synthetic resin as described above, its elastic deformation can be further smoothly brought to make the opening and closing movement of the upper body 2*b* more smoothly, and the cost of manufacturing can be further reduced. If the protruding portion 20 and the penetrating hole 5 are provided at only one place, a central portion of the longest side of the flat bed portion 3*a*, which is opposite to the side where the flat bed 3 is rotated around (that is, on the front side edge of FIG. 1), would be very effective in retaining the upper body 2*b* in the closed position. However, in the above embodiment, the document feed tray 7 is disposed on the left side of the cover portion 3*b* in FIG. 1, and when only the cover portion 3*b* is opened, force is applied slightly leftward. Thus, as shown in FIG. 1, the protruding portion 20 and the penetrating hole 5*c* are placed somewhat leftward from the center.

Additionally, the protruding portion 20 may not be deformed and the penetrating hole 5*c* may be deformed instead when the protruding portion 20 passes through the penetrating hole 5*c*. For example, in a modification shown in FIG. 13, members 5*d* form the vicinity of the penetrating hole 5*c* provided in the operation panel 5. The members 5*d* are engaged in a main body of the operation panel 5 such as to freely slide in directions where the penetrating hole 5*c* expands and returns. Springs 59 are provided between each member 5*d* and the main body of the operation panel 5. In this case, the members 5*d* are urged by the respective springs 59 in the direction where the penetrating hole 5*c* expands. However, when the protruding portion 20 passes through the penetrating hole 5*c*, the members 5*d* are pressed by the periphery of the protruding portion 20 and moved toward the periphery of the penetrating hole 5*c*, and the penetrating hole 5*c* expands. After the protruding portion 20 passes through the penetrating hole 5*c*, the penetrating hole 5*c* returns to its original state.

Figure 13:
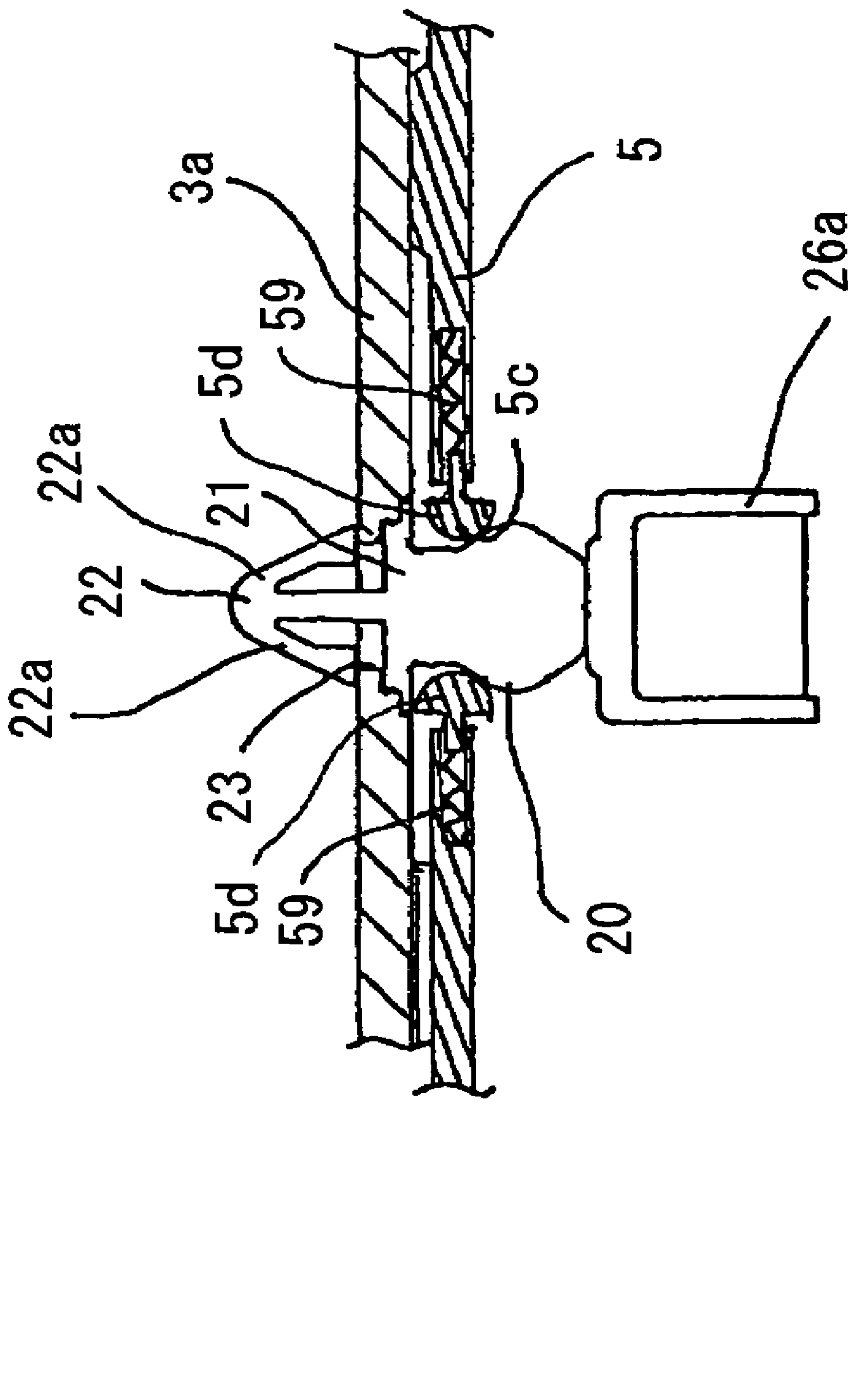
FIG. 13 is an enlarged view of a configuration in the vicinity of a protruding portion and a penetrating hole of the multifunction machine as a modification.

This case also allows the penetrating portion 20 to elastically engage with the penetrating hole 5*c* as is the case with the above embodiment. In this case, the protruding portion 20 does not need to be deformed, and may be formed into a solid structural part, as shown in FIG. 13. Further, as shown in FIG. 13, each member 5*d* has a bevel at a place where it contacts the protruding portion 20, which facilitates deformation of the penetrating hole 5*c*. In addition, the penetrating hole 5*c* may be provided in the flat bed portion 3*a* (or the cover) and the protruding portion 20 may be provided in the operation panel 5 (or the housing) instead. A penetrating hole itself may be elastically deformed when a protruding portion passes through the penetrating hole.

The invention is applicable to not only various image information apparatus such as a printer and a scanner, but also various information apparatus such as information processing devices, for example, a laptop computer, and information terminals, for example, a cellular phone.

In the above embodiment, the replacement of the ink cartridge 11 is shown as an example, however, the replacement of a toner cartridge in a laser printer and the replacement of an ink ribbon cartridge in a label printer may be applicable. In addition, the replacement of spare parts of the information processing device such as a laptop computer and the information terminal described above may be also applicable.

The term “elastic engagement” refers to an engagement wherein at least one of two members is elastically deformed for engagement between the two members and returned to its original shape after the engagement to secure the engagement. A click sound may be produced by the elastic engagement.

In the information apparatus structured above, when the cover is open or closed, the protruding portion provided in the cover or the housing passes through the penetrating hole provided in the cover or the housing. At this time, at least one of the protruding portion and the penetrating hole is elastically deformed to allow at least the end part of the protruding portion to pass through the penetrating hole, and the deformed one is returned to its original shape after the end part of the protruding portion passes through the penetrating hole. Thus, when the cover is closed, the end part of the protruding portion is elastically engaged with the penetrating hole through tactile feedback, thereby the cover is retained in the closed position.

The detection device detects the state of the cover based on the presence or absence of the engagement between the end part of the protruding portion and the penetrating hole. When the elastic engagement between the protruding portion and the penetrating hole is utilized, it can be achieved even though an inconsistent relative positional relationship between the protruding portion and the penetrating hole exists. Thus, the positional relationship between the protruding portion and the penetrating hole may be rough. Additionally, the engagement between the protruding portion and the penetrating hole described above is relatively strong against a force applied in a vertical direction (a direction perpendicular to a direction that the protruding portion or the penetrating hole is moved) as compared with an engagement by a hook, for example. For this reason, such an engaging device (a combination of the protruding portion and the penetrating hole) is capable of retaining the cover in the closed position excellently, even though provided in only one location.

Thus, in the exemplary aspect of the invention, even though the positional relationship among the protruding portion, the penetrating portion, and the detection device is relatively rough, excellent detection accuracy can be obtained, and there is no need to provide the protruding portion and the penetrating hole at a plurality of places. Thus, in the information apparatus of the invention, although the cost of manufacturing can be reduced, the reliability of detection of the state of the cover can be improved.

What is claimed is:

1. An information apparatus comprising:

a housing;

a cover mounted to the housing in an openable and closable manner;

a detection device that detects an open state and a closed state of the cover;

a penetrating hole provided in one of the housing or the cover; and a protruding portion provided in the housing or the cover where the penetrating hole is not provided, wherein when the cover is opened or closed, at least one of the protruding portion and the penetrating hole is elastically deformed to allow an end part of the protruding portion to pass through the penetrating hole, and the at least one of the protruding portion and the penetrating hole that is elastically deformed is returned to an original state thereof after the end part of the protruding portion has passed through the penetrating hole, when the cover is closed, the end part of the protruding portion and the penetrating hole are connected by elastic engagement, and the detection device detects the open state and the closed state of the cover based on a presence or absence of the engagement between the end part of the protruding portion and the penetrating hole.

2. The information apparatus according to claim 1, wherein the cover is configured to rotate about a first end thereof and open and close with respect to the housing, and the protruding portion or the penetrating hole is provided in substantially a central portion of a second end of the cover.

3. The information apparatus according to claim 1, further comprising:

a transfer member that is pressed and moved by the protruding portion passed through the penetrating hole when the cover is closed, wherein the detection device detects the open state and the closed state of the cover by detecting a position of the transfer member.

4. The information apparatus according to claim 1, wherein a clearance is horizontally provided between the protruding portion and the penetrating hole when the cover is closed.

5. The information apparatus according to claim 1, wherein when the cover is opened or closed, the protruding portion is elastically deformed to shrink a width thereof, and at least the end part thereof passes through the penetrating hole and returns to an original state thereof after passing therethrough.

6. The information apparatus according to claim 5, wherein the protruding portion includes a pair of facing elastic portions having V-shaped configurations with respective tops facing outward, and an inner wall defining the penetrating hole abuts with inclined portions of the V-shaped configurations in the elastic portions.

7. The information apparatus according to claim 6, wherein the elastic portions are formed of synthetic resin.

8. The information apparatus according to claim 6, wherein the protruding portion has a hexagonal shape when viewed in a cross section at least in a normal state.

9. The information apparatus according to claim 8, wherein the protruding portion is connected to a flange portion that extends in a direction perpendicular to a protruding direction of the protruding portion therefrom, and is further integrally formed with an elastically deformable engaging portion that protrudes from the flange portion on an opposite side of the protruding portion, and the engaging portion is press-inserted into a mounting hole provided in the cover or the housing, a portion defining the mounting hole is held between the engaging portion and the flange portion, and the protruding portion is fixed.

10. The information apparatus according to claims 9, wherein the mounting hole provided in the cover or the housing is formed stepwise when viewed in a cross section so as to narrow in a direction where the engaging portion is press-inserted, and the flange portion is formed stepwise so as to be engageable with steps of the mounting hole.

11. The information apparatus according to claim 1, further comprising in the housing:

an output device that performs an image output onto a recording medium; and a storing portion that stores a recording material to be used in the output device, wherein at least one of the output device and the storing portion is accessible by opening the cover.

12. The information apparatus according to claim 11, wherein the storing portion includes a replaceable cartridge that is attached to and removed from the housing.

13. The information apparatus according to claim 12, wherein the output device includes an ink-jet type recording head that forms an image onto the recording medium, and the storing portion includes a detachable ink cartridge for supplying ink to the recording head.

14. The information apparatus according to claim 11, further comprising:

a maintenance control device that causes the output device to perform a maintenance operation as a trigger when the detection device detects that a status of the cover has reached the closed state from the open state.

15. The information apparatus according to claim 14, comprising:

a determining device that determines whether the storing portion is activated while the cover is open, wherein the maintenance control device changes a maintenance operation according to a determination by the determining device.

16. The information apparatus according to claim 1, wherein the cover comprises:

a document base for placing a document horizontally thereon;

a reading device that reads image information of the document placed on the document base; and a document base cover that is disposed to open and close with respect to the document base, wherein the protruding portion or the penetrating hole is provided under the document base.

17. The information apparatus according to claim 1, further comprising:

a transfer member that rotates around a center with a first end heavier than a second end, wherein the second end is pressed by the protruding portion and the transfer member rotates in a first direction when the cover is closed so that the detection device detects the closed state and the transfer member rotates in a second direction when the protruding portion is removed from the second end so that the detection device detects the open state.

18. The information apparatus according to claim 1, wherein when the penetrating hole is elastically deformed, at least one spring is provided between a surface of the penetrating hole and a main body of the housing or the cover.

19. A method of closing a housing relative to a cover; comprising:

elastically deforming at least one of a penetrating hole, provided in one of the housing or the cover, or a protruding portion, provided in the housing or the cover where the penetrating hole is not provided, to allow an end part of the protruding portion to pass through the penetrating hole;

returning at least one of the protruding portion and the penetrating hole that is elastically deformed to an original state thereof after the end part of the protruding portion has passed through the penetrating hole, wherein the end part of the protruding portion and the penetrating hole are connected by elastic engagement; and detecting the closed state of the cover based on a presence of the engagement between the end part of the protruding portion and the penetrating hole.

20. The method according to claim 19, wherein a clearance is horizontally provided between the protruding portion and the penetrating hole when the cover is closed.

* * * * *